May 9, 1967 G. A. SHORT 3,318,976

PRODUCTION OF MODIFIED POLYOLEFIN

Filed Dec. 3, 1965

INVENTOR:
GLEN A. SHORT
BY: *Martin S. Baer*
HIS ATTORNEY 3,318,976
PRODUCTION OF MODIFIED POLYOLEFIN
Glen A. Short, Walnut Creek, Calif., assignor to Shell Oil Company, New York, N.Y., a corporation of Delaware
Filed Dec. 3, 1965, Ser. No. 511,528
9 Claims. (Cl. 260—878)

This application is a continuation-in-part of copending application Ser. No. 77,776, filed Dec. 22, 1960, now abandoned, and of Ser. No. 183,145, filed Mar. 28, 1962.

This invention relates to methods for the production of ethylene-modified polypropylene product.

Crystalline polypropylene is a thermoplastic polymer which has recently achieved commercial importance. Highly crystalline polypropylene has the desirable properties of high tensile strength and substantial hardness. Its crystallinity and resultant physical properties are associated with its sterically regular molecular arrangement, and tend to decrease with decreasing stereoregularity. Substantially isotactic polypropylene is also characterized by substantial insolubility in saturated non-aromatic hydrocarbon solvents at room temperature and moderately elevated temperatures.

A disadvantage of polypropylene in commercial ranges of isotacticity is its brittleness and low impact resistance[1] at relatively low temperatures, such as 0° C. and below. This severely handicaps the applicability of highly isotactic polypropylene to uses such as vessels or containers which may be subject to mechanical shock during use, particularly at low ambient temperatures. The impact resistance at 20° C. and above of polypropylene of moderately high isotacticity is satisfactory, but it decreases with increasing crystallinity.

The physical properties of polypropylene are also affected by its molecular weight. The property which is usually employed as an indication of molecular weight of polypropylene is the so-called intrinsic viscosity (I.V.). The intrinsic viscosity of isotactic polypropylene, measured in decalin at 150° C. and expressed in dl./g., can vary from 0.3 or less to 20 or more. The intrinsic viscosity of general purpose grades of polypropylene is generally between 2 and 3.5. Injection grades of polypropylene, i.e., those which are to be fabricated into articles by injection molding, desirably have an intrinsic viscosity in the range from 2.3 to 2.5. For the production of extruded articles, e.g., pipe, intrinsic viscosities of the order of 5 are satisfactory.

Low temperature impact resistance of polypropylene of fixed isotacticity increases with increasing intrinsic viscosity. Hence, polypropylene of moderately good low temperature impact resistance can be produced by known methods if one is willing to go to a high enough I.V. However, polypropylene of high I.V. presents difficulties in fabricating processes and is therefore in many instances not commercially acceptable or competitive.

The problem which led to this invention was the need for a polypropylene product which retains a substantial part of the high tensile strength which is associated with high isotacticity but which nevertheless has an unusually high impact resistance at low temperatures and also has a molecular weight in the commercially desired range, and for an effective, economical method of producing such a product.

The primary object of this invention is to provide an improved, commercially practical process for producing a polymer which combines the desirable properties of isotactic polypropylene with satisfactory impact resistance at low temperatures.

A further object is to provide a commercially useful process for producing a novel crystalline polypropylene product characterized by improved impact resistance at low temperatures and by retention of satisfactory tensile strength, particularly at molecular weights corresponding to intrinsic viscosities in the range from 2 to 6 dl./g. A further object is to provide a method for producing such a product which also has improved transparency.

Another object is to provide a commercially useful process for producing a specially structured, modified polypropylene product useful, inter alia, for blending into isotactic polypropylene in the production of superior blends of improved impact resistance at low temperatures.

Broadly stated, the major object of this invention is to provide a novel, practical method for producing from propylene and ethylene modified polypropylene products which combine good tensile properties with good impact resistance at low temperatures.

Other objects will appear from the following description of the invention, in which reference is made to the drawing, wherein.

Figures 1, 2:
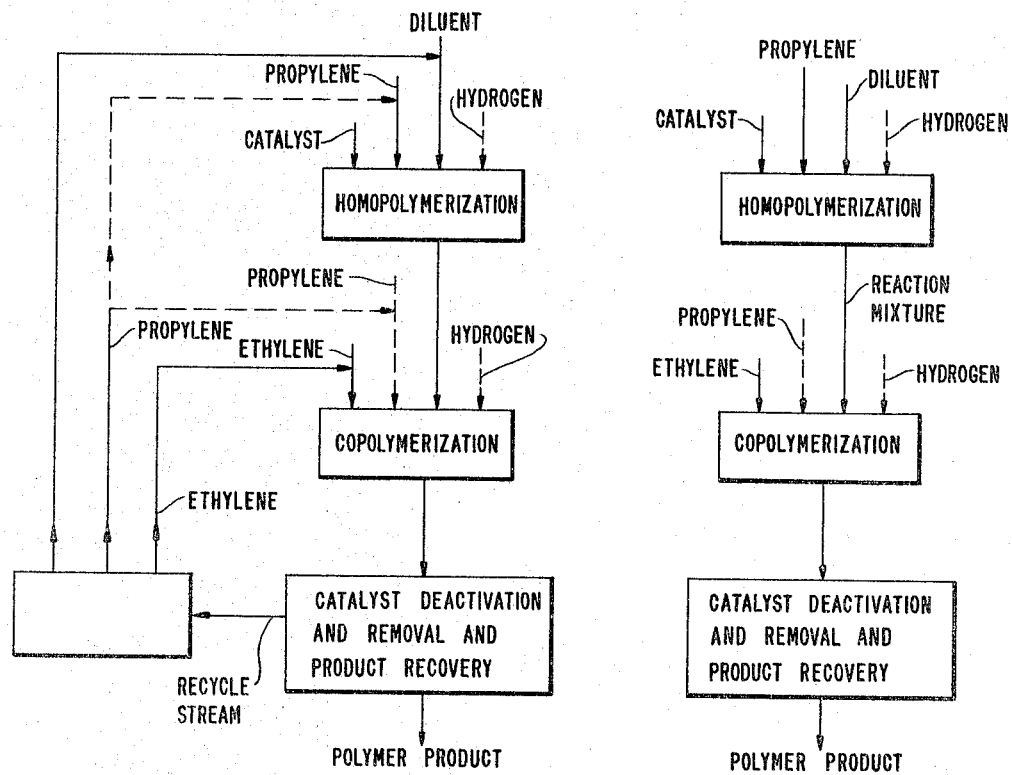
FIGURE 1 is a block diagram which illustrates the process of this invention.
FIGURE 2 is a block diagram which illustrates a preferred mode of practicing the process of this invention.

It is known that polypropylene blends of improved impact resistance at low temperatures can be made by blending polypropylene with large amounts of polyethylene or with moderately large amounts of elastomers, e.g., isobutylene-based rubbers or ethylene-propylene random copolymer. Physical blending methods require additional manufacturing steps, and blends are inferior to products made according to this invention, particularly in that their tensile strength is lower at comparable levels of impact resistance.

It has also been suggested to make block polymers in which segments of polypropylene alternate with segments of other polymer at frequent intervals.

In a two-component system of proplyene and ethylene, block polymerization can result in an infinite variety of products, varying in content of each monomer, in number of alternating blocks, in purity of each block, in ratio and order of monomers in single copolymer blocks, and the like. The resulting products can vary from crystalline polymers essentially like polypropylene to non-crystalline polymers essentially like ethylene-propylene elastomers.

It is known to produce products having a useful bal-

---
[1] The impact resistance of polypropylene is suitably tested by ASTM Standard Method D256-56 for impact resistance of plastics, using the Izod type (method A). The test measures the energy expended by a pendulum in breaking with one blow a notched test strip of standard dimensions. The results are reported as foot pounds per inch of notch, which is commonly shortened to "foot pounds per inch" and abbreviated "ft. lb./in." To measure the impact resistance at 0° C., as used in this specification, the test specimen is conditioned for at least four hours in an ice water slush and is placed on the impact machine and tested within 30 seconds, preferably within 10 seconds after removal from the cold bath.
Unless otherwise stated, impact values and other strength properties mentioned herein, are measured on test bars made by compression molding at 220° C.

nce of properties in which the molecules consist of a multiplicity of alternating blocks of polyethylene and polypropylene. However, in producing useful products of this nature, it is necessary to strip unused monomer from the reaction mixture after each sequence of polymerization before addition of the second monomer; if this is not done the product tends to be excessively rubbery. In another method of producing multiple-block polymers ethylene can be periodically added to a reactor in which propylene is being polymerized. This results in a product in which most of the polymer chain consists of random polymer of propylene and ethylene of varying ethylene content; the consequence is an excessive loss of crystallinity and tensile strength. In effect, the latter relatively simple method of producing multiple block polymers results in poor crystallinity and properties associated therewith, while carefully controlled methods require a processing sequence which is prohibitively complex and expensive for commercial utilization.

I have now found that it is not necessary to utilize complicated and expensive multistep block polymerization methods to produce polypropylene products which combine very good tensile properties with very good resistance to impact at low temperatures. I have found that ethylene modified polypropylene product having a highly advantageous combination of crystallinity and impact resistance can be produced by first polymerizing propylene under stereoregulating conditions and then polymerizing in the same reaction mixture a mixed feed of substantially constant proportion of ethylene and propylene. The resulting product is surprisingly superior to multiple block polymers produced by commercially practicable methods. It is also superior, to a commercially significant extent, to two-block polymers of propylene and ethylene produced by other methods.

A suitable method for practicing the process of this invention comprises first homopolymerizing propylene by contact with a highly stereospecific Ziegler type olefin polymerization catalyst until the concentration of solid polymer particles in the reaction slurry is at least about 30% of the desired final concentration, thereafter continuing polymerization in the presence of a mixture of propylene with ethylene wherein the concentration of propylene is in excess of ethylene, stopping the polymerization reaction when the amount of polymer has reached the desired final concentration, and recovering ethylene-modified polypropylene product.

Product produced according to this invention contains as an essential component thereof, molecules in which a portion of irregular ethylene-propylene copolymer is attached to one end of an isotactic polypropylene polymer chain, the total amount of ethylene units in said product being in the range from 1 to 20 percent by weight and the proportion of ethylene units in said ethylene-propylene copolymer being between 20 and 90% by weight. Analytical evidence of the described structure is the fact that it is not possible to make a complete separation between the isotactic and the copolymer fraction by extraction. After 24 hours in boiling cyclohexane, the major part of copolymer remains in the cyclohexane-insoluble portion. However, a minor proportion of copolymer is formed as unattached molecules in the process of this invention; the proportion of copolymer molecules which remains unattached is affected by the reaction conditions in a manner which is explained below.

The physical properties of products produced according to this invention are a function of the interplay of several factors.

The proportion of the product which is stereoregular polypropylene is important to preservation of desirable tensile strength. This proportion should be at least about 80% by weight of the total polymer and may be as high as 90 to 99% by weight. Products in which this proportion is 80 to 90% are also suitable as blending stock for blending into conventional isotactic polypropylene, as described in my copending application Ser. No. 183,012, filed Mar. 28, 1962.

The improvement in impact properties is a function of the ethylene-to-propylene ratio of the copolymer fraction, of the proportion of the copolymer fraction in the total product, and of the manner in which the copolymer fraction is structurally integrated into the total product.

The copolymer fraction produced in the process should have a content of ethylene units between 20% and 90% by weight, i.e., ethylene-to-propylene weight ratios between 20:80 and 90:10. If the copolymer segments have relatively high ethylene contents between 40 and 80% by weight the product has good impact properties due to its copolymer content while at the same time retaining good tensile properties due to the fact that the copolymer segments are only a small part of the whole product. The best balance of physical properties is generally obtained when the copolymer segment contains between about 50% and about 65 or 70% of ethylene in substantially even distribution. "Substantially even distribution" does not necessarily require statistical randomness; it does mean that the ethylene-to-propylene ratio does not vary systematically from one end to the other of the copolymer segment. The term "irregular" as applied to the copolymer segment similar signifies the absence of systematic variation in the structure of the copolymer segment. When the ethylene content of the copolymer segment is in the range from 70 to 80%, the product has improved transparency.

The ethylene content of the whole product is in the range from 1% by weight to about 20% by weight. When total ethylene contents are below about 1%, the improvement in impact resistance is not sufficient to result in commercially desirable product. For practical purposes a minimum concentration of ethylene of 2% is generally preferred.

Propylene products produced according to this invention are characterized by the following relationship of Izod impact value at 0° C. with intrinsic viscosity:

| Intrinsic viscosity, dl/g.: | Izod impact at 0° C., ft. lb./in. |
|---|---|
| 2–3 | ≥0.75 |
| 3–3.5 | ≥1.0 |
| >3.5 | ≥2.0 |

In products produced acording to this invention there is an inverse relationship between tensile strength and impact strength. The products should have a tensile yield strength [1] of at least about 3,000 p.s.i. The process of this invention is readily controlled to produce products having substantially the following relationship between impact resistance at 0° C. and tensile yield strenth:

Izod impact at 0° C., ft. lb./in.:

|  | Tensile yield strength, p.s.i. |
|---|---|
| 0.75 | 3700–4100 |
| 1.00 | 3500–3900 |
| 2.00 | 3000–3500 |

In the process of this invention propylene is polymerized by contact with a suitable low-pressure polymerization catalyst under conditions suitable for stereospecific polymerization. During the final period of polymerization the feed is changed so that ethylene and propylene are present in controlled proportion until the desired total conversion has been attained. The reaction is then stopped and the product recovered. The point at which the reaction is to be terminated to produce a polymer having the desired content of ethylene and copolymer can be determined from experience with test runs or other runs at a given set of conditions.

In this process, the addition of ethylene is begun after a predetermined proportion of the desired total propylene ---
[1] Tensile yield strength, measured at 0.2 inch per minute, according to ASTM Test No. D638–56T.

conversion has been obtained. The total propylene conversion is usually selected to result in a final polymer concentration in the range from 5 to 30% or higher based on the reaction mass. The highest polymer concentration that can be physically handled without difficulty is preferred.

The polymerization process can be suitably carried out with highly stereospecific catalyst systems at reaction conditions which lead to the production of polypropylene of very high isotacticity. A great variety of stereospecific catalysts have been described in the literature. Known effective catalysts are species or modifications of the so-called Ziegler catalyst; that catalyst consists, broadly, of two-component systems comprising a compound of the left hand sub-groups of Groups IV–VI or Group VIII of the Mendeleev Periodic Table, as illustrated on page 28 of Ephraim, "Inorganic Chemistry," 6th English edition, and a Group I–III element or alloy or hydride or organic derivative having an organometallic bond. Suitable Ziegler-type catalysts can be selected from the references listed on pages 350 to 361 of "Linear and Stereoregular Addition Polymers" by Gaylord and Mark, Interscience Publishers, Inc., New York, N.Y., 1959.

The most effective catalysts for the production of isotactic polypropylene known to date are those comprising titanium trichloride and certain aluminum alkyls and aluminum alkyl halides. These are also the most desirable for use in this invention. The titanium trichloride used in such catalysts may be produced by reduction of titanium tetrachloride by means of reducing metals, e.g., aluminum, or by means of hydrogen. In the preparation of particularly highly stereospecific catalysts, titanium trichloride is prepared by reducing titanium tetrachloride by contact with aluminum triethyl or another aluminum trialkyl. The mixture is preferably heated to result in a suspension of purple titanium trichloride. The total reaction product of this first reaction step is used with sufficient aluminum alkyl, e.g., aluminum triethyl or aluminum diethyl chloride, to give a total aluminum to titanium mole ratio of at least 1:1. Preferred aluminum to titanium mole ratios are in the range from 2:1 to 3:1, but ratios up to 4:1 or 5:1 are sometimes used, and still higher ratios may be used, if desired. These preferred catalysts, as well as other similar Ziegler-type catalysts, useful in the process of this invention, are described in more detail in U.S. Patent No. 3,147,238, and in U.S. Patent No. 2,971,925, both to Winkler et al. The disclosures of said patents, insofar as they refer to polymerization catalysts, are included herein by reference.

An essential characteristic of the process of this invention is that both homopolymerization and copolymerization are carried out with the identical catalyst. No catalyst killing step intervenes between the two reaction steps. If the two steps are to be carried out in separate vessels, the reaction mass which is transferred between vessels includes both polymer and catalyst. Catalysts for use in the process of this invention must permit continued growth of polymer chains during the full reaction period, including the homopolymerization and copolymerization steps.

Compounds which modify the action of the catalyst may be present in the reaction mixture. For example, hydrogen may be added to limit the molecular weight of the polymer, or trace amounts of water added to increase catalyst stereospecificity. The use of catalyst-modifying and reaction-modifying additives is known; they can be used in amounts and in a manner known to produce the desired effects, provided they are found, by testing, not to exert an undesired effect on the ability of the catalyst to permit formation of block polymers.

In the homopolymerization step of this invention, the degree of isotacticity of the polypropylene segments produced is a function of the choice of catalyst and of the reaction conditions, including reactant purity. These effects are known.

In the overall process, the ratio of copolymer segments to homopolymer segments in the final product is a function of the relative amounts of monomer conversion in the homopolymerization and copolymerization steps. This, in turn, depends primarily on catalyst reactivity and concentration in the two polymerization zones and on the relative reaction times or residence times.

The ethylene-to-propylene ratio of the copolymer segments is a function of the ratio of ethylene to propylene in the copolymerization reaction mixture and of the catalyst and reaction conditions in the copolymerization stage. Conditions for controlled copolymerization of ethylene and propylene with Ziegler-type catalyst are known.

A further product variable which can be independently varied is the intrinsic viscosity. This can be controlled in known manner, e.g., by the presence of hydrogen in the reaction mixture in the homopolymerization zone or in the copolymerization zone, or both. Intrinsic viscosity is also affected in known manner by other variables, such as reaction temperature and ratio of catalyst components.

The conditions under which the reactions of homopolymerization and copolymerization take place are selected from those which are known for olefin polymerization with stereoregulating Ziegler-type catalysts.

The reaction pressure is generally between atmospheric and about 500 p.s.i. It is generally selected to be at least sufficiently high to keep the reaction diluent in liquid phase at the selected reaction temperature.

The reaction temperature is in the range from 0° to 120° C., and preferably from 25° to 70° C. At lower temperatures in these ranges the reaction rate is relatively low, but the isotacticity in the homopolymerization step is high and the proportion of attached to unattached copolymer in the copolymerization step is high. With the preferred catalyst, the most practical temperature for the process of this invention is generally between 50° and 60° C.; a temperature of about 50° C. is especially preferred for the copolymerization step.

The reaction is carried out in a solvent medium in liquid phase. While the medium may be any non-aromatic saturated hydrocarbon from ethane up to paraffinic fractions in the gasoline or kerosene boiling range, the preferred mode of this invention ins carried out in a relatively low-boiling hydrocarbon, which can be separated from the polymer product by vaporization at atmospheric pressure below the melting or sticking temperature of the polymer. Paraffinic hydrocarbons of from three to six carbon atoms per molecule are preferred and the butanes and pentanes especially preferred.

Catalyst concentration in Ziegler-type polymerization is conventionally held at the lowest practical level. In the process of this invention, however, it is preferred to employ a substantially higher concentration, from two to four times that conventionally employed. A suitable concentration range is from 1.5 to 5 millimoles of $TiCl_3$ per liter of reaction mixture. With a $TiCl_3$ –$AlEt_2Cl$ catalyst, this typically results in utilization of 1 to 10 grams of $TiCl_3$ per 1000 grams of polymer product. A preferred range is between 1 and 2 millimoles/liter (2 to 4 grams of $TiCl_3$ per 1000 grams polymer). The higher than normal concentration of catalyst in the homopolymerization step permits achieving the desired conversion in both polymerization steps in a shorter reaction time or with lower monomer concentration. This results in a higher proportion of growing polymer molecules in the charge to the copolymerization zone, and in a higher proportion of attached copolymer segments formed in the copolymerization zone.

The reaction time in homopolymerization is not critical, and is selected to achieve the desired proportion of total conversion, which is generally limited by the maximum slurry concentration. Homopolymerization time is generally in the range from 1 to 10 hours.

The reaction time in copolymerization should be held as low as is consistent with production of product having the desired proportion of copolymer. This time is generally in the range from 2 to 40 minutes, and preferably from 5 to 30 minutes.

The polymerization process of this invention can be carried out in a batch reactor or in a continuous reactor system. FIGURE 1 is a schematic illustration of the process, applicable to either method. Propylene, diluent, catalyst and, optionally, hydrogen are charged to a reactor. Propylene is polymerized until the desired polymer concentration in the reaction mixture has been obtained. The copolymerization step is then carried out in the same reaction mixture by simultaneous feeding of propylene and ethylene in predetermined ratio. After the desired amount of conversion has been obtained in the copolymerization step the reaction is terminated in well known manner, e.g., by adding a polar liquid such as an alcohol to the reaction mixture. The work-up and recovery of the polymer product can be carried out by methods which are well known in the production of polypropylene.

In batch reaction the polymerization is carried out as conventional propylene polymerization until a desired proportion of the desired amount of propylene has been polymerized; at that time ethylene addition to the reaction mixture is commenced. Batch reactions are usually carried out in an agitated vessel in which additional olefin monomer is added at the olefin supply is depleted. In the process of this invention, ethylene may be added in admixture with propylene in desired proportion at the time at which ethylene addition is to be commenced, or ethylene and propylene may be added at that time as separate streams in the desired ratio.

If the process is to be carried out in a continuous manner then it is suitable to produce the polypropylene in the same way in which it would otherwise be produced in a continuous process. Such a process is described, for example, in Serial No. 780,985 of Schwaar et al., filed December 17, 1958, now abandoned. In one mode of the Schwaar et al. process a plurality of reactors are operated with series flow of polymer slurry from one reactor to the next and with separate olefin feed to each of the reactors. In modifying such a process for preparing the product of this invention, the polymerization is controlled in such a manner that propylene polymerization is carried out in all but the last reaction in series; in that reactor a mixture of ethylene and propylene is charged. If desired, only two reactors may be used, the first to produce polypropylene and the second to complete the polymerization in the presence of a mixture of propylene and ethylene.

A prefered continuous mode of carrying out the process of this invention is schematically illustrated in FIGURE 2.

The charge to the homopolymerization zone consists of propylene, a light paraffinic diluent, e.g., a butane or pentane, catalyst and, optionally, hydrogen. At steady state, these materials are continuously charged and an approximately equal amount of total reaction mixture is continuously removed and charged to the copolymerization zone. Ethylene and propylene in predetermined ratio, together with additional hydrogen, if desired, are also continuously charged to the copolymerization zone. The residence time in the copolymerization zone is controlled to provide the desired additional conversion. Reaction mixture is continuously withdrawn from the copolymerization zone and charged to the catalyst removal and product workup zones. In the preferred mode, catalyst is deactivated by a polar reactant, such as an acidified alcohol, catalyst residue is washed out of the product, and the total slurry of hydrocarbon diluent, unconverted feed, and polymer product is separated by volatilizing the non-polymer components. Such a recovery method is described in more detail in U.S. Patent 3,040,015 to Cheney and Foster. The vaporized components, designated "recycle stream" in FIGURE 2 are suitably, e.g., by distillation, into a propylene fraction, an ethylene fraction, and a diluent fraction. Clean separation of components is not required, except that propylene recycled to the homopolymerization zone must be substantially free of ethylene. Its ethylene content should be no more than about 100 p.p.m. and preferably less.

The manner in which ethylene addition is controlled to achieve the product of this invention depends on the type of reaction system employed. It is known that ethylene is substantially less soluble in paraffinic hydrocarbon solvents than propylene. On the other hand, the rate of polymerization of ethylene in the presence of stereospecific catalysts is very much higher than the rate of polymerization of propylene. These two factors working in opposition to each other, permit a reasonable control of the polymerization.

An illustrative method suitable for batch reaction is that discussed in more detail in Example 1. The initial rate of addition of propylene is controlled at a known value. Then, when a predetermined proportion of the desired concentration of polypropylene in the reaction mixture, e.g., 90% has been obtained, the rate of propylene addition is reduced and ethylene is added at a rate equal to or lower than the rate of propylene addition. The molar ratio of ethylene to propylene addition rates is suitably between 0.01:1 and 1:1.

In a continuous system in which polypropylene is produced in one or a plurality of reactors and the slurry which contains polypropylene and catalyst is then passed to another reactor in which there is both propylene and ethylene present, the desired result can be achieved by controlling the ratio of ethylene to propylene in the feed to the second reactor and the residence times of the slurry in the reactors. The molar ratio of ethylene to propylene in the copolymerization reaction zone of a continuous process is suitably in the range from 0.01:1 to 1:1.

Figure 3:
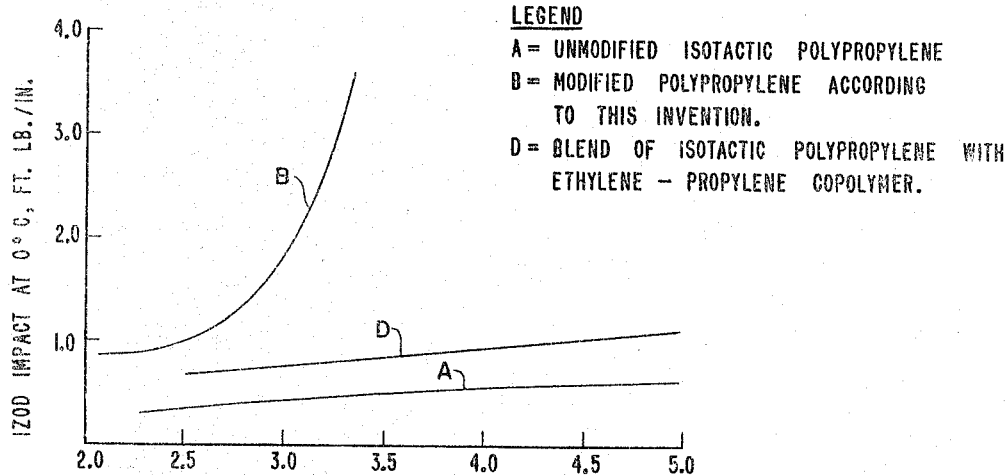
FIGURE 3 is a graph correlating changes in impact strength with intrinsic viscosity for products produced according to this invention and other related products.

The superiority of product made in accordance with this invention over product made by merely admixing polypropylene and conventional rubbery ethylene-propylene copolymer in proportions which result in similar ethylene contents, or by copolymerization ethylene with propylene in the same proportions but by different methods, is further illustrated by reference to FIGURE 3 of the drawing, which is a plot of the variation of Izod Impact at 0° C. with intrinsic viscosity for various polypropylene products of approximately constant ethylene content and proportion of copolymer to homopolymer. In FIGURE 3, product A is conventional isotactic polypropylene without ethylene. Curve B is an average curve, representative of products produced according to this invention. For products of different ethylene contents, a family of curves exists which have a shape similar to curve B. Product D represents milled blends of isotactic polypropylene with rubbery ethylenepropylene random copolymer.

From inspection of FIGURE 3 it is immediately apparent that product B shows a tremendous increase in low temperature impact strength with increasing molecular weight, compared with conventional isotactic polypropylene, product A. Product D, a blend of polypropylene with conventional rubber ethylene-propylene copolymer, is somewhat better, but still greatly inferior to product B.

Contrary to what might be expected, identical products are not produced when the procedure of this invention is reversed and a mixture of ethylene and propylene is first polymerized, followed by addition of propylene to the reaction mixture. While such product is useful, it has a lower tensile strength and a lower impact resistance at a given ethylene content; it is inferior in its balance of properties to product made by the method of this invention. It has been theorized that this is due to an adverse effect of ethylene on the stereoregulating ability of the catalyst. Such product has also been found to have a higher proportion of unattached copolymer molecules compared to product produced according to this invention at comparable reaction conditions.

Inferior product is also produced by methods in which the ratio of ethylene to propylene is not held substantially constant during the copolymerization step. The reactivity of ethylene exceeds that of propylene; hence, when a mixture of ethylene and propylene of fixed initial composition is allowed to react to completion it will result in a copolymer of varying composition, the first portion being high in ethylene and the last high in propylene. Even as little as 1% of ethylene randomly distributed in a propylene sequence reduces crystallinity significantly. However, the degree of low temperature impact resistance imparted to the product by the presence of the copolymer segments increases as the proportion of ethylene in the segments increases up to an ethylene content of about 50% by weight. Segments containing at least about 50% ethylene are fully effective. Accordingly, products in which ethylene-propylene segments have a varying distribution—sometimes referred to as "tapered" —have substantially lower crystallinity and poorer tensile properties at a given low-temperature impact resistance value than do products produced according to this invention.

The invention will be better understood from the following examples which, however, are presented only for purpose of illustrating preferred modes of practicing the invention and the results obtainable by the invention and are not to be considered as limiting the invention. Parts and percentages stated are by weight unless otherwise indicated.

EXAMPLE 1

The following illustrates the practice of this invention in a batch reaction.

Into a 1.5 liter agitated pressure vessel there is placed a mixture of 1200 ml. (milliliters) heptane, 4 mmols (millimoles) titanium trichloride and 12 to 16 mmols of aluminum diethyl chloride. The titanium trichloride used is suitably prepared either by reduction of titanium tetrachloride by means of aluminum metal or by reduction of titanium tetrachloride by means of aluminum triethyl. To the reaction vessel there is added from 50 to 100 ml. of hydrogen, depending on the I.V. which is desired for the final product. For the sake of a specific illustration, 60 ml. of hydrogen is added, measured at atmospheric temperature and pressure. The autoclave is closed and heated to a temperature of 60° C. Propylene is then rapidly added, at the rate of 7 grams per minute, until the pressure in the reaction vessel is 45 p.s.i. About 60 grams of propylene is thus added. Thereafter the rate of propylene addition is decreased to 2 grams per minute, which maintains this pressure. When 140 grams of propylene has been added the rate of propylene addition is decreased to 1 gram per minute and ethylene addition is commenced at the rate of about ½-gram per minute. Both propylene and ethylene addition are discontinued 10 minutes thereafter. The total amount of propylene thus added is 150 grams and the amount of ethylene added is 5 grams. Agitation is continued for a brief period until the gas pressure begins to drop below 45 p.s.i. At this point a substantial part of the ethylene which had been added has polymerized. The catalyst present in the reaction mixture is then killed by adding 50 ml. of 10% HCl in isopropyl alcohol. Polymer is removed from the reaction slurry by filtration and is washed to free it of catalyst residue. Oxidation inhibitor is then added to the polymer.

The recovered modified polypropylene product has the following properties, mechanical properties being determined on specimens which are compression molded at 190° C. and annealed in sequence at 100° C. for 16 hours and at 23° C. for 24 hours.

| | |
|---|---|
| Intrinsic viscosity, dl./dg. | 3.0 |
| Yield strength, p.s.i., measured at 0.2 in./min. | 3800 |
| Elongation at yield, percent | 10 |
| Tensile modulus, p.s.i. | $2.25 \times 10^5$ |
| Impact strength, notched Izod, ft. lb./in.: | |
| 23° C. | No break |
| 0° C. | 1.4 |
| Hardness, Rockell M | 16 |

EXAMPLE 2

The following illustrates the practice of this invention in a continuous reaction.

In a 1 liter agitated pressure vessel there is maintained a liquid reaction mixture consisting of isopentane, propylene, polymerization catalyst, and powdered polypropylene, formed in the reaction. The reactor is maintained at 60° C. Propylene is continuously charged at the rate of 50 g./hr., together with an equal weight of isopentane. There is also continuously added 0.05 g./hr. of titanium trichloride (0.3 millimoles/hr.) and 0.2 g./hr. of aluminum diethyl chloride (1 millimole/hr.), and an amount of hydrogen known to maintain polymer intrinsic viscosity at 2.8 dl./g. Reaction mixture is continuously withdrawn from the reaction zone at a polymer withdrawal rate of 15 g./hr., and charged directly to a 0.1 liter reactor, which is maintained at 50° C. The reaction mixture charge to the copolymerization reactor contains 35 grams per hour of propylene. Ethylene is added to the second reactor at the rate of 4 g./hr. The residence time in the second reactor is about 20 minutes. Reaction slurry is continuously withdrawn from the second reactor, contacted with a catalyst deactivating liquid, washed free of catalyst residue, and separated by heating below the melting point of the polymer into a dry polymer powder product and a vapor product, which may be recovered and recycled as illustrated in FIGURE 4.

The polymer product has an ethylene content of 10% by weight, an I.V. of 3.0, a tensile yield strength of 3500 p.s.i., and an Izod impact strength, at 0° C., of 1.5 ft. lb./inch notch.

EXAMPLE 3

The low temperature impact strength of products prepared according to this invention and their tensile strengths are compared with the same properties of related products. The resulting data are listed below in Table 1.

In the preparation of all products compared in Table 1, the polymerization is carried out with stereospecific catalysts essentially identical to that used in Example 1. Products A-1, A-2 and A-3 are isotactic polypropylene, prepared without addition of any other monomer. Products B-1 through B-4 are products according to this invention, made according to the general method described in Example 1, with some variation in the proportion of monomers. Products C-1 through C-6 are prepared by a method of block polymerization in which the propylene polymerization is periodically interrupted by adding ethylene to be copolymerized with propylene during a brief period, after which ethylene addition is again discontinued. This periodic addition of ethylene is carried out by adding a predetermined amount of ethylene each time after a predetermined amount of propylene has been added; the relative amounts are stated in Table 1. Products D-1 through D-6 are milled blends of finished highly crystalline polypropylene with rubbery ethylene-propylene copolymer. The blends are prepared by coating polypropylene powder with a solution of the copolymer, drying and then milling on a roll mill for 3 minutes at 180–200° C.

TABLE 1

| Polymer Type and Number | Number of Sequences | Ethylene Content, Percent wt. | Proportion of Copolymer | Proportion of Ethylene in Copolymer Segments, Percent wt. | Intrinsic Viscosity, dl./g. | Izod Impact, Notched, ft. lb./in. Notch at 0° C. | Tensile Yield Strength, p.s.i. |
|---|---|---|---|---|---|---|---|
| Ethylene-free Polypropylene: | | | | | | | |
| A-1 | | 0 | | | 2.3 | 0.2 | |
| A-2 | | 0 | | | 3.1 | 0.37 | |
| A-3 | | 0 | | | 4.8 | 0.61 | |
| This Invention: | | | | | | | |
| B-1 | 2 | 7.1 | 12.8 | 48 | 2.5 | 0.79 | 4,080 |
| B-2 | 2 | 5.5 | 10.3 | 54 | 2.9 | 0.80 | 3,860 |
| B-3 | 2 | 6.6 | 13.2 | 53 | 3.0 | 1.35 | 3,545 |
| B-4 | 2 | 8.5 | 16.8 | 51 | 3.4 | 3.22 | 3,350 |
| Multiple Block: | | | | | | | |
| C-1 | 4 | 8 | | [2] 10/70 | 2.0 | 1.31 | 2,610 |
| C-2 | 14 | 10 | | [2] 5/50 | 1.8 | 1.8 | 1,800 |
| C-3 | 19 | 7.5 | | [2] 5/50 | 2.3 | 2.86 | 1,900 |
| C-4 | 22 | 7 | | [2] 3/40 | 2.3 | 1.65 | 2,500 |
| C-5 | 16 | 7 | | [2] 3/50 | 2.4 | 1.49 | 2,280 |
| C-6 | 12 | 5 | | [2] 5/80 | 2.2 | 0.86 | 2,605 |
| Milled Blend: [1] | | | | | | | |
| D-1 | | 3.6 | 10 | 41 | 3.1 | [1] 0.76 | 3,600 |
| D-2 | | 3.8 | 10 | 43 | 3.1 | [1] 0.70 | 3,580 |
| D-3 | | 4.8 | 10 | 53 | 3.1 | [1] 0.64 | 3,530 |
| D-4 | | 5.9 | 10 | 65 | 2.5 | [1] 0.60 | 3,500 |
| D-5 | | 5.9 | 10 | 65 | 2.8 | [1] 0.78 | 3,300 |
| D-6 | | 5.9 | 10 | 65 | 5.3 | [1] 1.38 | 3,100 |

[1] Impact strength measured on test bars compression molded at 190° C. Values higher.
[2] a/b means (a) parts of ethylene added after each (b) parts of propylene.

It is seen from the data in Table 1, that product having high impact resistance at low temperature while retaining good tensile properties can be readily prepared according to this invention, with intrinsic viscosity in the commercially practical range. By contrast, multiple block products achieve similar impact values only at a great sacrifice in tensile strength and milled blends also have an inferior combination of impact and tensile strength. The present invention is shown to solve a serious practical product limitation in an elegant manner not achievable by other methods.

EXAMPLE 4

Further improvements in the modified polypropylene product of this invention can sometimes be obtained by addition of a crystal modifying agent, as illustrated by the following data.

Modified polypropylene product was prepared essentially as described in Example 1 above. The tensile yield strength, impact strength and hardness of specimens which had been compression molded at a temperature of 220° C. were determined. Other portions of the polymer were blended with various amounts of adipic acid. The additive was incorporated in the polymer by adding the acid to the polymer on a hot plastics mill and milling 5 minutes thereafter. Samples of the resulting products were compression molded at 220° C. and then similarly tested for tensile yield strength, impact strength and hardness.

The raw polymer contained in excess of .005% by weight of titanium and .010% by weight of aluminum as residue from the polymerization. Its ethylene content was 2.2% by weight and its intrinsic viscosity 2.5 dl./g.

Data of the tests of the uncompounded polymer and the polymer containing adipic acid are shown in Table 2.

TABLE 2

| Product | Percent wt. Adipic Acid | Tensile Yield, 0.2 in./min., p.s.i. | Izod Impact ft. lb./in. 0° C. | Izod Impact ft. lb./in. 23° C. | Hardness, Rockwell M |
|---|---|---|---|---|---|
| B-5 | 0.00 | 3,490 | 0.89 | 3.97 | 11 |
| B-6 | 0.10 | 3,550 | 1.53 | [1] 7 | 15 |
| B-7 | 0.25 | 3,555 | 1.71 | [1] 12 | 15 |
| B-8 | 0.50 | 3,515 | 1.58 | [1] 8 | 14 |

[1] Hinged break.

It is seen from Table 2 that the use of crystal modifying additive resulted in some increase of the tensile yield strength of the polymer and in a substantial increase of the Izod Impact values of the polymer both at 0° C. and at 23° C., as well as some increase in hardness.

Similarly improved results are obtained when in lieu of adipic acid there is used benzoic acid, phenylacetic acid, aluminum adipate, aluminum tet.butyl benzoate, aluminum salt of phenylacetic acid, hexahydrozenzoic acid, and the like, selected from the group of effective compounds of the Wijga and Wales patents, mentioned below.

Since products produced according to this invention consist essentially of polypropylene having a small amount of ethylene contained therein, they are generally referred to in this application as "modified polypropylene," or "modified polypropylene product." Having reference to the fact that ethylene is incorporated in polypropylene in accordance with this invention in a novel and unusual chemical structure, the product may also be referred to as "modified, specially structured polypropylene product."

The polypropylene products of this invention have chemical properties essentially like polypropylene, including great stability to attack by various chemicals but some sensitivity to deterioration both under the influence of oxygen and heat and under the influence of actinic radiation.

Conventional methods of modifying polypropylene for various commercial purposes are applicable to the modified polypropylene products produced according to this invention. This includes the use of oxidation inhibitors or heat stabilizers, flow promoting additives, slip additives, antistatic additives, pigments, fillers, and the like. Selection can be made from the great variety of materials of these various classes which are known to the art. The selection of an individual additive will not ordinarily be affected by the difference of the modified polypropylene products from conventional polypropylene products.

It is particularly advantageous to incorporate into modified polypropylene compositions produced according to this invention a small amount of a crystallization modifying additive which acts as crystal nucleating agent. The addition of a small amount of such material often results in substantial further increases in the resistance of the product to impact at low temperatures. Particularly useful crystal modifying compounds for this purpose are certain carboxylic acids, their anhydrides and certain of their salts. The acids are disclosed in detail in U.S. patents, 3,207,735, 3,207,736 and 3,207,738 to Wijga, and their salts in 3,207,737 and 3,207,739 to Wales. The disclosures of these patents are incorporated herein by reference.

Typical effective acids are succinic, benzoic and phenylactic acid. Typical effective salts are aluminum tert. butyl benzoate and sodium benzoate.

The presence of crystal nucleating agents in compositions produced according to this invention often accelerates the rate at which the ultimate strength of shaped products is developed. The presence of such agents also tends to result in improvement of product properties when product shaping procedures are carried out at relatively high temperatures.

We claim as our invention:

1. A method of producing an ethylene-modified polypropylene product containing as an essential component thereof molecules in which a portion of irregular ethylene-propylene copolymer is attached to one end of an isotactic polypropylene polymer chain, the total amount of ethylene units in said product being in the range from 1 to 20% by weight and the proportion of ethylene units in said ethylene-propylene copolymer being between 20 and 90% by weight, which comprises first homopolymerizing propylene by contact with a highly stereospecific Ziegler type olefin polymerization catalyst consisting essentially of a two-component system comprising a compound selected from the group consisting of the left hand subgroups of Groups 4, 5, 6 and of Group 8 of the Mendeleev Periodic Table and a co-catalyst selected from organometallic compounds of metals from groups 1, 2 and 3 of the Periodic Table, until the concentration of solid polymer particles in the reaction slurry is at least about 80% of the desired final concentration, thereafter continuing polymerization in the presence of a mixture of propylene with ethylene wherein the concentration of propylene is in excess of ethylene, stopping the polymerization reaction when the amount of polymer has reached the desired final concentration, and recovering said ethylene-modified polypropylene product.

2. The method of claim 1 wherein said catalyst consists of the reaction product of titanium trichloride and aluminum diethyl chloride.

3. The method of claim 1 wherein hydrogen is present in the polymerization mixture while propylene is the sole monomer present.

4. A continuous process for producing an ethylene-modified polypropylene product in which the major proportion of ethylene is associated with polypropylene in such manner that it is not extractable in boiling cyclohexane in 24 hours, said product containing as an essential component thereof molecules in which a portion of irregular ethylene-propylene copolymer is attached to one end of an isotactic polypropylene polymer chain, the total amount of ethylene units in said product being in the range from 1 to 20% by weight and the proportion of ethylene units in said ethylene-propylene copolymer being between 20 and 90% by weight, which process comprises the steps of (1) continuously charging to a homopolymerization zone propylene and a paraffinic hydrocarbon diluent;

(2) maintaining in said homopolymerization zone an active concentration of a highly stereospecific Ziegler type olefin polymerization catalyst consisting essentially of titanium trichloride and an aluminum alkyl compound;

(3) conducting propylene polymerization in said homopolymerization zone to maintain the polypropylene concentration in the reaction slurry at least about 80% of the desired final polymer concentration;

(4) continuously passing part of the reaction slurry to a copolymerization zone;

(5) continuing polymerization in said copolymerization zone in the presence of a mixture of ethylene and propylene in predetermined fixed molar ratio in the range from 0.01:1 to 1:1 to produce a polymer slurry having said desired final concentration of polymer;

(6) continuously withdrawing reaction slurry from said copolymerization zone;

(7) deactivating catalyst in said slurry and removing catalyst residue therefrom; and (8) recovering said ethylene-modified polypropylene product.

5. The process according to claim 4 wherein:

(1) said catalyst consists of titanium trichloride and aluminum dialkyl chloride;

(2) the concentration of catalyst in said homopolymerization zone is in the range from 1 to 2 millimoles of $TiCl_3$ per liter of reaction mixture;

(3) said diluent is a paraffinic hydrocarbon of from three to six carbon atoms per molecule;

(4) the temperatures in the homo- and copolymerization steps are in the range from 25 to 70° C.;

(5) the residence time in said copolymerization zone is in the range from 2 to 40 minutes; and (6) the reaction conditions are selected to produce a polymer containing at least about 80% isotactic polypropylene, associated with copolymer segments containing from 40 to 90% ethylene, and having an Izod impact strength at 0° C. of at least 0.75 and a tensile yield strength (at 0.2 in./min.) of at least 3000 p.s.i.

6. The process according to claim 5 wherein:

(1) polymer product is retained slurried in the total original diluent up to the final ploymer recovery step;

(2) all non-polymer hydrocarbon is separated from the polymer product by vaporization;

(3) the recovered non-polymer hydrocarbons are separated into at least a stream containing the predominant amount of diluent and one containing unreacted ethylene;

(4) diluent is recycled to said homopolymerization zone and ethylene to said copolymerization zone;

(5) propylene is recycled to at least one of said zones.

7. The process according to claim 5 wherein the temperatures in the homo- and copolymerization steps are in the range from 50 to 60° C.

8. The process according to claim 4 wherein hydrogen is present in the reaction mixture in the homopolymerization zone.

9. The process according to claim 4 wherein hydrogen is present in the reaction mixtures both in the homopolymerization zone and the copolymerization zone.

No references cited.

MURRAY TILLMAN, *Primary Examiner.*

D. BREZNER, *Assistant Examiner.*